Jan. 29, 1963

T. FLATOW 3,075,608

SYSTEM FOR SEISMIC PROSPECTING USING
THE WEIGHT DROPPING TECHNIQUE

Filed Jan. 14, 1959

INVENTOR.
TOBIAS FLATOW,

BY *John B Davidson*

ATTORNEY.

INVENTOR.
TOBIAS FLATOW,
ATTORNEY.

3,075,608
SYSTEM FOR SEISMIC PROSPECTING USING THE WEIGHT DROPPING TECHNIQUE
Tobias Flatow, Houston, Tex., assignor, by mesne assignments, to Jersey Production Research Company, Tulsa, Okla., a corporation of Delaware
Filed Jan. 14, 1959, Ser. No. 786,853
2 Claims. (Cl. 181—.5)

This invention relates to seismic prospecting, and more particularly to obtaining information regarding physical characteristics of the weathered layer of the earth.

One of the methods of seismic prospecting involves the generation of seismic waves by dropping a heavy weight on the earth's surface at a plurality of impact points on a line between seismic wave detecting positions. Some of the seismic waves generated at the point of impact are transmitted down into the earth and are reflected by boundaries separating subsurface strata which have different physical properties. The reflected waves are detected by geophones positioned at the detecting locations and are recorded on a recording medium. The resulting information may be examined by seismic computers to determine physical properties of the subsurface strata. To accurately determine the depths of the reflecting horizons, it is necessary for the computer to know the velocity at which seismic waves are propagated through the weathered layer of the earth, as well as the depth of the weathered layer. The computer's problem is complicated by the fact that both the thickness of, and the velocity of propagation through, the weathered layer may vary considerably at relatively closely spaced locations.

The present invention contemplates the use of two patterns of seismic wave detectors arranged at separated points, each pattern being electrically interconnected to detect reflections from reflecting horizons deep within the earth; see U.S. Patent 2,759,551—Carlisle et al., for a discussion of an appropriate arrangement of geophones for this purpose. A plurality of single geophones are stationed on a line joining the centers of the patterns. (Instead of each single geophone, a group of geophones may be positioned closely together in haphazard fashion and electrically connected to serve as a single geophone. Such a group is commonly called a cluster of geophones, and is to be distinguished from a pattern of geophones. A cluster is used instead of a single geophone merely to insure good coupling to the earth. The term "single" or "individual" geophones as used herein is to be understood to include a cluster of geophones as defined above.) A succession of seismic impulses are produced along the line, preferably by dropping a heavy weight as described above. After each seismic impulse, the output signals produced by the first of the single geophones on each side of the impulse point are recorded for a few tenths of a second after the impulse. Thereafter the signals produced by the patterns of geophones are recorded. The output signals of the single geophone and of the geophone pattern on a given side of the impulse point are recorded as a single seismogram record trace, with the single geophone producing the first portion of the trace and the geophone pattern producing the latter portion of the trace. The first arrivals at the single geophones are the seismic waves that are either transmitted directly from the impact point to the geophones or refracted along the interface at the bottom of the weathered layer. The traces produced as described above are recorded with the "breaks" in line, preferably in variable density form, and in side-by-side relationship in the order of the locations of the seismic impulses. The resultant recording is a composite seismogram which possesses information relative to both deep subsurface strata and also to the shallow low-velocity stratum. From such a seismogram, it is possible to glean far more information relating to the earth's subsurface than has been possible using prior art weight-dropping techniques.

The invention will be described in greater detail with reference to the accompanying drawings, wherein.

Figure 1:
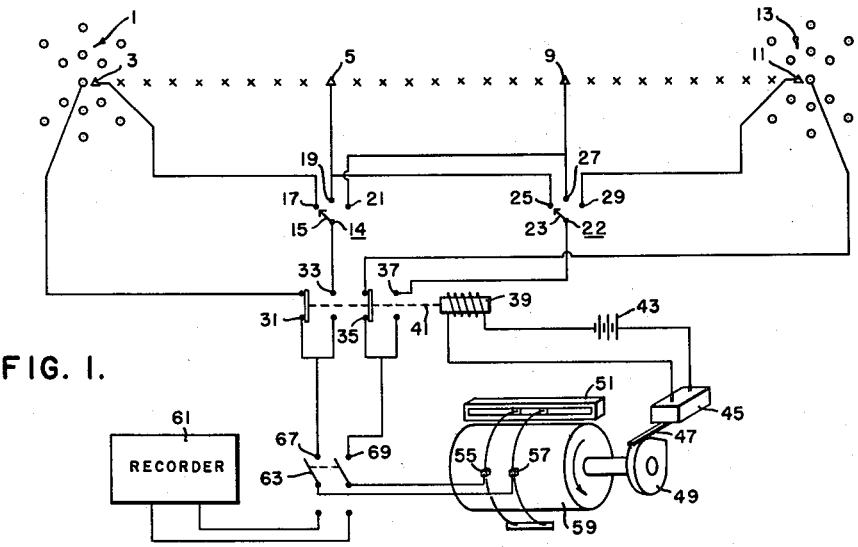
FIG. 1 is a schematic diagram of apparatus that may be used in connection with the present invention.

In FIG. 1 there are shown two patterns of geophones 1 and 13, the centers of which may be spaced apart on the earth's surface by distances varying between 1000 and 8000 feet, depending upon the terrain, the depths of reflecting horizons to be mapped, and other variables. The geophones may be arranged in a star pattern such as is described in U.S. Patent No. 2,759,551. The geophones in each pattern are electrically interconnected to produce a single output signal; the electrical interconnections are not shown in FIG. 1 to avoid cluttering the drawing.

Figure 2:
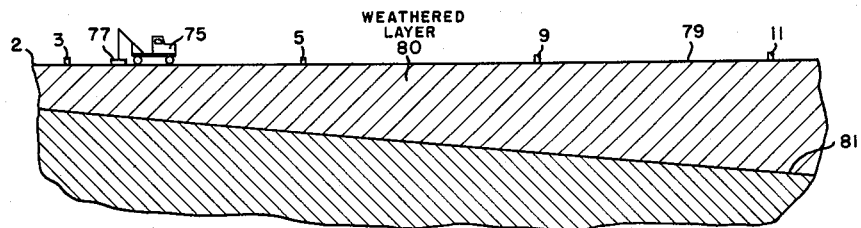
FIG. 2 is a representation of a portion of the earth's subsurface and of a weight-dropping truck at the earth's surface, that is useful in understanding the present invention.

Spaced apart on a line between the centers of the geophone patterns 1 and 13 are a plurality of single geophones 3, 5, 9, and 11; these geophones are not electrically connected to the geophones in patterns 1 and 13. The single geophones may vary in number depending upon the distances between the geophone patterns 1 and 13 and on the irregularity expected in the depth and velocity of seismic wave propagation presented by the weathered layer 80 of the earth's crust (see FIG. 2). The single geophones (hereinafter termed refraction geophones) may be spaced apart between 500 and 2000 feet. The refraction geophones should be arranged as nearly as possible along a straight line between the centers of the geophone patterns, with the end geophones, here shown as geophones 3 and 11, being positioned as nearly as possible at the centers of the geophone patterns 1 and 13, respectively.

Conventional seismic wave recording equipment is provided for the purpose of recording seismic waves detected by the refraction geophones and the geophone patterns. The seismic waves result from seismic impulses which preferably are produced by dropping a heavy weight at a multiplicity of impact points between the geophone patterns 1 and 13. The impact points are noted by "X" marks in FIG. 1.

The recording equipment preferably is of the type that records seismic waves as reproduceable traces, such as the type that utilizes magnetic tape or a magnetic drum as the recording medium. A magnetic tape transport mechanism 59 is shown in FIG. 1 along with associated recording and reproducing heads 55 and 57, and apparatus 51 for positioning the heads 55 and 57 longitudinally and circumferentially with respect to tape transport 59. A second recorder 61 is provided for the purpose of re-recording the traces in visual form. Recorder 61 may be of one of the types that record electrical signals in variable density form.

Selector switches 14 and 22 are provided for the purpose of connecting adjacent pairs of refraction geophones to the recording means. Cam 49, microswitch 45, and relay 39 selectively connect either the refraction geophones or the reflection geophones to the recording heads 55 and 57 over predetermined portions of each recording interval. Double pole-double throw switch 63 selectively connects the geophones to heads 55 and 57 for recording the electrical signals from the geophones, and connects the heads to recorder 61 when the heads are reproducing electrical signals previously recorded as traces on magnetic tape carried by transport mechanism 59.

In accordance with the present invention, seismic waves may be generated by dropping a heavy weight at a plurality of impact points (designated in FIG. 1 by "X" marks) between the geophone patterns 1 and 13. The dropping of the weight starts the recordation of geophone output signals in a manner conventional to the art, such as is described in U.S. Patents No. 2,851,121 and No. 2,851,122 of B. McCollum.

Seismic wave initiating apparatus for producing seismic waves by dropping a weight on the earth's surface is described in U.S. Patent No. 2,851,121—McCollum.

For interpreting the final composite seismogram, it is necessary that the impact pulses on the various traces (corresponding to the various impacts) be lined up on the same time line. Such alignment can be done by re-recording techniques or by the use of apparatus such as described in U.S. Patent No. 3,011,583 of F. J. Feagin et al. Electrical connections between the apparatus described in U.S. Patent No. 3,011,583, the weight release mechanism, and a break switch on the weight would be made in accordance with prior art teachings.

When a seismic impulse is to be initiated between geophones 3 and 5, movable contact member 15 is connected to contact 17, and movable contact member 23 is connected to contact 25. Similarly, when a seismic impulse is to be initiated between geophones 5 and 9, movable contacts 15 and 23 are respectively adjusted to engage contacts 19 and 27, and when a seismic impulse is to be initiated between geophones 9 and 11, contacts 15 and 23, respectively, will be adjusted to engage contacts 21 and 29. Thus, the refraction geophones on each side of a point at which an impulse is to be initiated will be in circuit relationship with the recording system.

Cam 49 may be constructed so as to actuate microswitch 45 during the first portion of a seismic observation. Actuation of microswitch 45 will close the contact members thereof to energize the actuating coil 39 of relay 41 by current from direct current source 43. The duration of this first portion of the seismic observation should be at least the time required for a seismic wave initiated at the location of one of the refraction geophones to be received at the adjacent seismic geophones when the wave either passes directly through the weathered layer of the earth or is refracted at the interface 81 (see FIG. 2) between the weathered layer 80 and the next lowest layer of the earth's crust. Usually an interval of 0.3 second will be sufficient when the distance between refraction geophones does not exceed 1000 feet.

Let it be assumed that movable contact arms 15 and 23 are adjusted to engage contacts 17 and 25, respectively, so that geophones 3 and 5 are connected in the circuit, and that switch 63 is thrown so as to connect the contacts of relay 41 to heads 55 and 57. Let it also be assumed that heavy weight 77 is suspended above the earth by a suitable lifting mechanism on truck 75 (see FIG. 2) between geophones 3 and 5. Shortly after the instant that the weight is dropped toward the earth, cam 49 will engage actuation arm 47 to close the contacts of microswitch 45, thus energizing coil 39 of relay 41 and closing contacts 33 and 37. For approximately the first three-tenths of a second of the recording interval, signals produced by seismic waves generated by impact of weight 77 and detected by geophones 3 and 5 will be coupled to heads 55 and 57 through contacts 67 and 69 of switch 63. After the initial portion of the recording interval, the cam will release actuating arm 47 to open microswitch 45 and de-energize actuating coil 39 of relay 41. The relay 41 will open contacts 33 and 37 and close contacts 31 and 35 to connect geophone patterns 1 and 13 to recording heads 55 and 57.

The output signals of the geophones in each of the patterns 1 and 13 will be summed to obtain a pair of electrical signals so that a single trace will be recorded corresponding to each of the geophone patterns. Thus, two individual traces will be produced. The first portion of each trace will be the record of the output signals from a refraction geophone and the latter portion will be the record of the output signals from the associated geophone pattern.

The weight is dropped a number of times on the line between the centers of the geophone patterns. The drops may be spaced 25 to 100 feet apart to obtain satisfactory results in most areas. However, if desired, the drops may be spaced closer together or further apart depending upon the detail required in a given area. As described above, the contact arms 15 and 23 are adjusted to connect in the circuit the first refraction geophone on each side of the impact point at which the weight is to be dropped.

After the weight has been dropped at all of the impact points between the geophone patterns, the traces recorded in magnetic form may be reproduced in visual form. This may be done by any suitable apparatus well known to the prior art. For example, switch 63 may be thrown so that heads 55 and 57 are coupled to recorder 61 and the traces may be reproduced one at a time in visual form by recorder 61. Other more suitable apparatus may be used.

Figure 3:
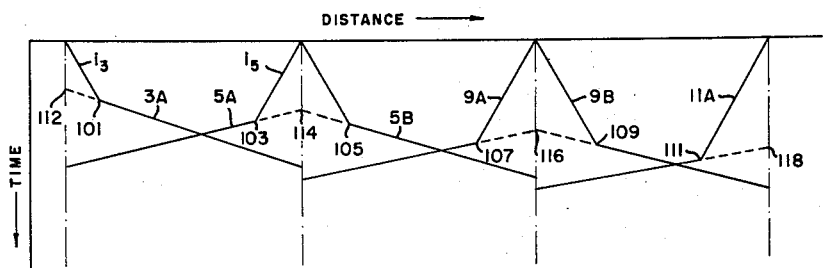
FIG. 3 is a travel time curve that may be plotted from data obtained by the method used in connection with the system indicated in FIGS. 1 and 2.
Figure 4:
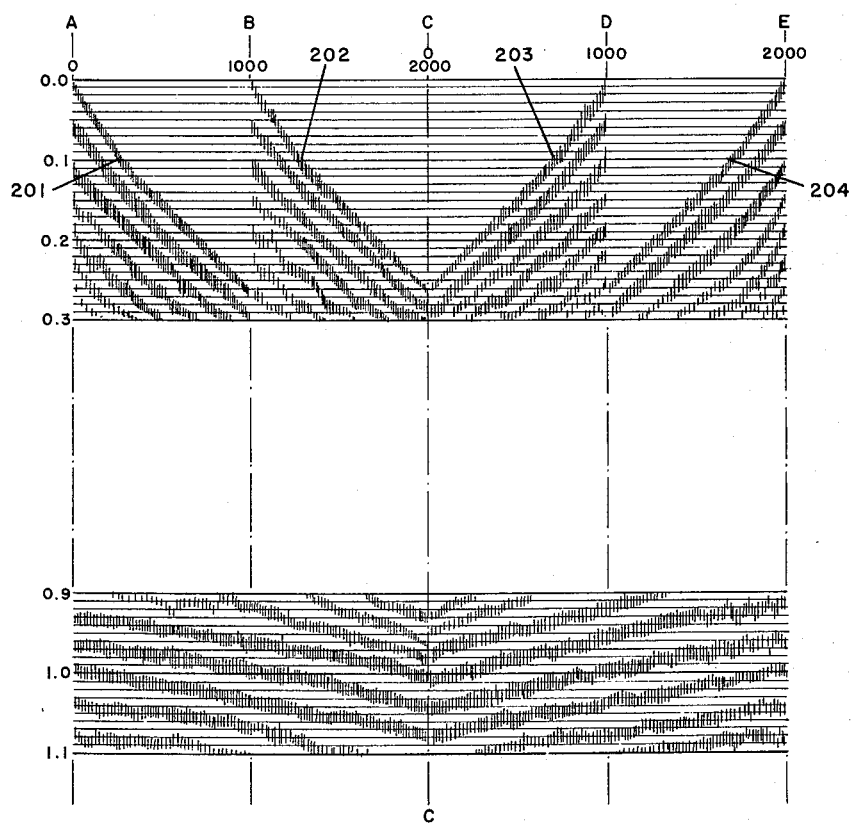
FIG. 4 is a reproduction of a portion of a variable density seismogram made in accordance with the teachings of the present invention.

A variable density seismic record copied from a portion of a seismogram made in accordance with the teachings of the invention is shown in FIG. 4. The significance of the record and its utility will be better understood after an explanation of FIG. 3, wherein are depicted travel times as a function of drop locations, of refracted and of directly transmitted first arrivals to geophones 3, 5, 9, and 11 from various impact points on the earth's surface between the geophones. The distance axis in FIG. 3 corresponds to distances on the cross-section of the earth shown in FIG. 2, distances being measured to the right from point 2 on the earth's surface 79. In FIG. 3, line 3A is assumed to have been obtained from seismic records produced by geophone 3, curves 5A and 5B from seismic records produced by geophone 5, etc. The relationships shown in FIG. 3 are essentially straight lines with discontinuities at 101, 103, 105, 107, 109, and 111. The discontinuities in the travel time lines represent the points at which the seismic waves begin to be refracted by the interface 81 (FIG. 2) rather than directly transmitted from the impact points to the refraction geophones.

From the slopes of these straight lines associated with each successive pair of geophones can be determined $V_0$, which is the velocity of the seismic waves in the low velocity layer 80, and also $V_1$, which is the velocity in the first stratum below interface 81. This calculation (and also the ones indicated below) are well known in the seismic art. From $V_0$ and $V_1$ can then be determined the emergence angle $i$, which is the angle at a given geophone between the vertical line at the geophone and the ray path to the geophone followed by waves refracted from interface 81. In FIG. 3 are shown $i_3$ and $i_5$, the emergence angles associated with the first pair of geophones 3 and 5. The intersection of the extension of the straight lines corresponding to the refracted waves, with the vertical lines through the geophones, gives the intercept time, which may be designated $t_0$. For example, the time $t_0$ associated with geophone 3 is indicated by point 112; for the other geophones the corresponding points are 114, 116, 118, respectively. Finally, from these various values, the depth $h$ of the low velocity layer at any particular geophone location can be determined from the formula $$h = \frac{t_0 V_0}{2 \cos i}$$

and the one-way travel time in the low velocity layer is simply the product $hV_0$.

FIG. 4 is a copy of a portion of a variable density seismogram obtained in accordance with the present invention. FIG. 4 illustrates portions of the first 1.1 seconds of a complete seismic record, but it is sufficient to illustrate the significance of the present invention. The record from which the seismogram portion of FIG. 4 was copied, was obtained using two geophone patterns spaced about 2000 feet apart and three refraction geophones spaced 1000 feet apart. A refraction geophone was placed near the center of each geophone pattern; the other refraction geophone was positioned midway between the patterns.

The record shown in FIG. 4 may be regarded as consisting of portions of two variable density seismograms placed side by side, each corresponding to one of the geophone patterns. The individual traces run vertically down the record as shown. Consider first the seismogram portion to the left of line C—C. The first 0.3 second of each trace between A and B was obtained from a first refraction geophone at or near the center of one of the geophone patterns; the first 0.3 second of the traces between B and C was obtained from the second refraction geophone positioned midway between the centers of the geophone patterns. The portions of the traces after 0.3 second on the record were obtained from the geophone pattern within which the first geophone was positioned. Consider next the seismogram to the right of C—C. The first 0.3 second on the traces between C and D was obtained from the second geophone when the weight was being dropped between the first and second geophones. The first 0.3 second of the traces to the right of D was obtained from the third geophone located near the center of the other geophone pattern while the weight was being dropped between the second and third geophones. The portions of the traces after 0.3 of a second to the right of C were derived from the output signal of the second geophone pattern, only the portion between 0.0 second and 1.1 seconds being illustrated. This latter portion of the record illustrates a lineup believed to be produced by a seismic reflection.

The same information that can be derived from a set of manually plotted curves, such as is shown in FIG. 3, can be derived directly from a composite seismogram such as the reproduced seismogram portion shown in FIG. 4. The lines of first arrivals 201 and 203 in FIG. 4 correspond to the lines 3A and 5A, respectively, in FIG. 3. These lines form a reversed refraction profile. The lines of first arrivals 202 and 203 correspond to the lines described as being obtained from the output signals of a given geophone, for example, lines 5A and 5B which would be obtained from geophone 5. The slopes of the lines of first arrivals are the reverse of the slopes of lines 5A and 5B, but this presents no operational problem. The points of discontinuities on each of the lines of first arrivals in FIG. 4 occur at about 0.1 second on the record. This discontinuity can be seen best on line 204.

As an example of how the same information that can be gleaned from the relationships graphically depicted in FIG. 3 can be obtained from the seismogram of FIG. 4, let it be assumed that it is desired to obtain the thickness of the weathered layer beneath the middle refraction geophone. The lower portion of either of the lines of first arrivals 202 and 203 would be extended until it intersects with lines B and D, respectively. A time of about .03 second will be obtained. The velocity of seismic wave propagation through the weathered layer and the layer below can be obtained from the slopes of the lines of first arrivals, as was previously discussed. The thickness of the weathered layer and the travel time in the weathered layer can also be obtained by the formula given above.

Manifestly, no useful information can be derived from the first 0.3 second of a record of the signals obtained from the geophone patterns. Therefore, nothing is lost by recording the traces obtained from the output signals of the refraction geophones in the manner described above.

The portion of the composite seismogram obtained after 0.3 second enables a computer to obtain a very useful and complete picture of reflections from subsurface reflecting horizons. The portion of the seismogram obtained from the output signals of a given geophone pattern will contain reflections from that portion of the earth underlying the earth's surface between the center of the given pattern and the midpoint between the patterns. By placing the individual seismograms side by side to form a composite seismogram, a seismic "picture" of the reflecting horizons underlying the surface between the geophone patterns can be obtained. The low velocity information obtained from the refraction profiles on the first 0.3 second portion of the composite seismogram is necessary to correct and interpret the portion of the seismogram after 0.3 second.

While the above description and accompanying drawings present a satisfactory embodiment of the invention, it is not desired that the invention be limited thereby, but that the invention be limited only by the following claims.

I claim:

1. Apparatus for seismic surveying wherein seismic impulses are initiated by dropping a heavy weight at a multiplicity of locations along a line on the earth's surface, comprising: first and second geophone arrays areally positioned at opposite ends of the line on the earth's surface, with the geophones in each array being interconnected to produce a single electrical signal indicative of the sum of the electrical signals produced by the geophones of the array responsive to a seismic impulse; a plurality of individual geophones disposed at the ends of the line and at at least one intermediate location thereon; recording means, including first and second recording heads, for recording in reproducible form pairs of electrical signals produced by said individual geophones and said geophone arrays; and means in circuit relationship with said individual geophones and said geophone arrays and connected to said recording means, for connecting the closest of said individual geophones on each side of a given impulse location respectively to said first and second recording heads for a preselected time interval after a seismic impulse at said given location, and to thereafter connect said first and second geophone arrays respectively to said first and second recording heads respectively, the individual geophone coupled to a given recording head being on the same side of said given impulse location as the geophone array coupled to said given recording head, said preselected time interval being at least the shortest time interval required for a seismic wave initiated at the location of one of said geophones to travel to an adjacent geophone.

2. Apparatus for seismic surveying wherein seismic impulses are initiated by dropping a heavy weight at a multiplicity of locations along a line on the earth's surface, comprising: first and second geophone arrays areally positioned at opposite ends of the line on the earth's surface, with the geophones in each array being interconnected to produce a single electrical signal indicative of the sum of the electrical signals produced by the geophones of the array responsive to a seismic impulse; a plurality of individual geophones disposed at the ends of the line and at at least one intermediate location thereon; recording means, including first and second recording heads, for recording in reproducible form pairs of electrical signals produced by said individual geophones and said geophone arrays; first and second electrical terminals; first and second switch means in circuit relationship with said individual geophones for connecting two adjacent ones of said individual geophones individually to said first and second electrical terminals; and means, including third switch means, in circuit relationship with said first and second terminals, with said first and second geophone arrays, and with said first and second recording heads, and connected to said recording means, for connecting said first and second terminals respectively to said first and second recording heads for a predetermined time interval after each seismic impulse, and for connecting said first and second geophone arrays to said first and second recording heads after said predetermined time interval, said predetermined time interval being at least the shortest time interval required for a seismic wave initiated at the location of one of said individual geophones to travel to an adjacent individual geophone.

References Cited in the file of this patent

UNITED STATES PATENTS

| | | |
|---|---|---|
| 2,167,124 | Minton | July 25, 1939 |
| 2,267,858 | Dix | Dec. 30, 1941 |
| 2,348,409 | Parr | May 9, 1944 |
| 2,440,971 | Palmer | May 4, 1948 |
| 2,759,551 | Carlisle et al. | Aug. 21, 1956 |
| 2,767,389 | McCollum | Oct. 16, 1956 |
| 2,849,076 | Kaufman | Aug. 26, 1958 |
| 2,946,393 | Hawkins | July 26, 1960 |
| 2,949,974 | Beuermann | Aug. 23, 1960 |

OTHER REFERENCES

World Oil Magazine, "Weight-Drop Technique," by Alan D. Waldie, April 1956, pages 148, 150, 153 to 156 and 158.